United States Patent
Jakobsson et al.

(10) Patent No.: US 6,636,969 B1
(45) Date of Patent: Oct. 21, 2003

(54) DIGITAL SIGNATURES HAVING REVOKABLE ANONYMITY AND IMPROVED TRACEABILITY

(75) Inventors: Bjorn M. Jakobsson, Hoboken, NJ (US); Joy C. Mueller, Mainz (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/299,327

(22) Filed: Apr. 26, 1999

(51) Int. Cl.[7] ............................. G06F 17/60; H04L 9/30
(52) U.S. Cl. ....................... 713/180; 713/160; 713/161; 713/181; 705/69; 705/75; 705/77; 705/78
(58) Field of Search ................................. 713/160, 161, 713/180, 181; 705/69, 75, 77, 78

(56) References Cited

U.S. PATENT DOCUMENTS

| | | | |
|---|---|---|---|
| 4,759,064 A | 7/1988 | Chaum ........................ | 380/30 |
| 5,347,581 A | 9/1994 | Naccache et al. ............ | 380/30 |
| 5,787,172 A | 7/1998 | Arnold ........................ | 380/21 |
| 5,796,833 A | 8/1998 | Chen et al. .................. | 380/25 |
| 5,889,862 A * | 3/1999 | Ohta et al. .................... | 705/69 |
| 5,901,229 A * | 5/1999 | Fujisaki et al. .............. | 380/30 |

OTHER PUBLICATIONS

A. Juels et al., "Security of Blind Digital Signatures," 1997, Advances in Cryptology, Crypto '97, pp. 150–164.*
D. Chaum and H. van Antwerpen, "Undeniable Signatures", Advances in Cryptology—CRYPTO '89; Santa Barbara, CA; Aug. 1989; Springer–Verlag, pp. 212–216.
M. Jakobsson and M. Yung, "Applying Anti–Trust Policies to Increase Trust in a Versatile E–Money System,", Advances in Cryptography—Proceedings of Financial Cryptology '97, pp. 217–238.
M. Jakobsson and M. Yung, "Distributed Magic Ink Signatures," Advances in Cryptology—Proceedings of Eurocrypt '97, pp. 450–464.
M. Jakobsson,"A Practical Mix," Advances in Cryptology—Proceedings of Eurocrypt '98, pp. 448–461.
M. Bellare, A. Desai, D. Pointcheval and P. Rogaway, "Relations Among Notices of Security for Public–Key Encryption Schemes," Advances in Cryptology—Proceeding of Crypto '98, pp. 26–45.
M. Jakobsson and M. Yung, "Revokable and Versatile Electronic Money," 3rd ACM Conference on Computer and Communications Security, 1996, pp. 76–87.
B. M. Jakobsson, "Privacy vs. Authenticity," A dissertation submitted in partial satisfaction of the requirements for the degree Doctor of Philosophy in Computer Science, 1997,pp. 1–54.
R. Gennaro, S. Jarecki, H. Krawczyk, and T. Rabin, "Robust Threshold DSS Signatures," Advances in Cryptology—Proceeding of Eurocrypt '96, pp. 354–371.

* cited by examiner

Primary Examiner—Justin T. Darrow

(57) ABSTRACT

A method of authenticating electronic data is disclosed. In the preferred embodiment, when a Receiver makes a request to a Signer (e.g., a bank customer asks the bank to issue E-Coin), the Receiver includes a "hint generation value" in the request, and from the hint generation value, a "hint value" is derived and recorded on a signing transcript. The hint generation value is essentially an encrypted version of the request submitted from the Receiver to the Signer. When a merchant/Verifier transmits deposit signatures corresponding to spent E-Coin to be deposited, the transmitted signature is decrypted and blinded by the Signer in the same manner as that used to create the hint value. Thus, the encrypted incoming deposit signature from the merchant/Verifier should match the hint value stored on the signing transcript, confirming that the E-Coin is valid without revealing any identifying information about who spent the E-Coin, i.e., anonymity is preserved. If the incoming encrypted deposit signature does not match a hint value in the signing transcript, the bank immediately knows that counterfeit E-Coin is being circulated and can take the steps necessary to stop any further illicit transactions and attempt to identify the source of the corruption.

13 Claims, 2 Drawing Sheets

DIGITAL SIGNATURES HAVING REVOKABLE ANONYMITY AND IMPROVED TRACEABILITY

FIELD OF THE INVENTION

This invention relates to the field of authentication of electronic data, and more specifically, to producing digital signatures that allow for revokable anonymity and the ability to detect the unauthorized use of a secret key without compromising anonymity requirements.

DESCRIPTION OF THE RELATED ART

Electronic commerce (E-Commerce) is one of the fastest growing segments of the Internet. All aspects of monetary transactions are being carried out electronically including banking, investing, purchase and sales, and the like. While the benefits of E-Commerce are many, certain precautions must be taken to prevent abuse and to ensure that the privacy of the participants is not compromised. Accordingly, authentication techniques utilizing "electronic signatures" and "secret keys" have been developed so that assurances can be made that the transactions requested are legitimate transactions. Many examples of such techniques can be found in the prior art (see, for example, M. Jakobsson and M. Yung, "Applying Anti-Trust Policies to Increase Trust in a Versatile E-Money System," Advances in Cryptology-Proceedings of Financial Cryptography '97, pp. 217–238.

In view of the need for protection of privacy, much of the research in the field of E-commerce has been focused on developing payment or signature schemes with revokable anonymity. Such schemes facilitate general anonymity with respect to transactions, but allow details of a particular transaction or user to be identified under appropriate circumstances (e.g., pursuant to a court order). For example, a set of "trustees" might possess the ability to remove the anonymity of a given user or transaction when all agree that there is reason to believe that the user is committing a crime or that a particular transaction is fraudulent.

"Blinding" is a technique utilizing electronic signatures by which the provider of a message for signing, e.g., a bank customer, can transform the message to be signed into a form which obscures the content of the message. Thus, the signer, e.g., a bank, can sign the transformed message and return it to the provider of the message, and the provider can transform the message in such a way that the result retains the digital signature property related to the original message content, but the result is not readily associated with the transformed message received by the signer. One example of such a technique is disclosed in U.S. Pat. No. 4,759,063 to Chaum, incorporated herein by reference.

To understand the known methods of revoking anonymity it is necessary to understand the mechanics of electronic transactions. For example, a typical electronic transaction will involve three participants: a Signer, typically a bank; a Receiver, typically a consumer who is a customer of the Signer; and a Verifier, typically a merchant who transacts business with the Receiver.

For the purpose of this explanation, presume that a Receiver A has $10,000 in an established bank account with a Signer bank B. If Receiver A needs conventional cash, he or she simply goes into the bank or to an automatic teller machine (ATM), makes a withdrawal, and receives the cash in hand. If, however, Receiver A wants to have the ability to conduct electronic transactions, for example, with merchant (Verifier) C, then Receiver A needs to request a withdrawal of electronic cash (E-Coin) so that it will be available for use on demand.

To "withdraw" E-Coin, Receiver A sends a request to the Signer bank B and asks the bank to issue, for example, $2,000 in E-Coin to Receiver A. This request would typically be in the form of an authenticated encrypted e-mail message which allows the bank to confirm the identity of the requester. Signer bank B, after verifying that the funds are available, will issue the E-Coin (electronic funds, essentially an e-mail), encrypted using conventional encryption methods, and bearing a "signature" S which identifies Signer bank B as the issuer of the E-Coin. The signature S is a verification that the bank issued the E-Coin and that it is, therefore, acceptable to use for an electronic transaction.

The Signer bank B keeps daily transcripts, called "signing transcripts," of all E-Coin issued (withdrawn). This transcript is used to correlate withdrawals with the appropriate bank account. It is also used, as discussed below, to verify that E-Coin presented to a merchant/verifier is legitimate.

With the E-Coin now available for immediate spending (in this example, $2,000), Receiver A can present some or all of the E-Coin to Merchant C to transact business. Thus, if Receiver A wants to purchase a $200.00 item from Merchant C, Receiver A will send an electronic purchase request along with an electronic "draft" promising to pay Merchant C $200.00 of E-Coin. The electronic draft includes the signature S issued by the Signer bank B. Merchant C will then deliver the item to Receiver A and, possibly at a later time and/or date, present the electronic draft to the bank for payment.

Signer bank B keeps a second transcript, called herein a "spent E-Coin transcript", which identifies all E-Coin that has been deposited by a verifier such as a merchant or a payee (if an item is found on this transcript, this indicates that the E-coin identified has been spent). The spent E-Coin transcript gives the bank the ability to track the use of E-Coin by a particular bank customer so that assurances can be made that a particular bank customer has not "overdrawn" an account (the E-Coin is somewhat analogous to a checking account). For example, with the spent E-Coin transcript the bank can determine that more cash was spent than was issued to a particular user (an overdraft) and initiate a trace to identify the overspender.

Used in connection with the signing transcript, the spent E-Coin transcript also gives the bank the ability scan for the circulation of counterfeit E-Coin. By comparing the signing transcripts with the spent E-Coin transcripts, the bank can identify the existence of counterfeit E-Coin because there would be instances of the spending of E-Coin seemingly issued by the bank (e.g., bearing the banks electronic signature) but with no record of issuance in the signing transcript.

While the system described allows for recording and tracing of transactions, two basic problems exist. First, the correlation process is computationally costly because each transaction must be "examined" during the correlation process, which is a time-consuming task. Second, the system provides no anonymity, as the bank has access to complete information about the purchasing habits of its customers, which is unacceptable.

Recently, a technique referred to as "magic ink signatures" has been developed to offer revokable privacy and a new tracing option. This method is described in detail in "Distributed Magic Ink Signatures" by M. Jakobsson and M. Yung, Advances in Cryptology-Proceedings of Eurocrypt '97, pp. 450–464. According to this technique, the Signer bank B distributes the responsibility of both signing, tracing, and maintenance of detection mechanisms (e.g., the keeping of transcripts) among a subset of smaller "banks" (e.g., several isolated computer systems, several different offices of the bank, a government organization, or a combination thereof), so that no single unit has a complete record of a transaction, but instead several of the smaller banks must collaborate (i.e., a quorum is required) to trace the transaction. Only after it has been determined that an invalid signature has been obtained (or an overdraft has occurred) are the subset of smaller banks given the authority to collaborate to revoke the anonymity and identify the transaction or Receiver.

The above-described magic ink technique allows a tighter control over tracing by allowing suspicions to be verified without divulging any specific information about the signer, receiver, or verifier. Using the magic ink technique, three tracing options are available, namely (1) by tracing the identity of the spender from a particular unit of E-Coin; (2) by tracing a particular unit of E-Coin from the identity of a spender; or (3) by comparing one particular unit of E-Coin with the identity of one particular holder of E-Coin issued by the bank. Tracing options (2) and (3) have computational costs that are independent of the number of signatures that have been generated; thus they can be accomplished efficiently. However, tracing option (1), tracing the identity of a spender from a particular unit of E-Coin, has an expected computational cost which is linear in relation to the number of generated signatures. This relationship between the number of signatures and the cost of tracing raises a significant practical concern, since tracing option (1) is likely to be the most commonly-used technique, given that this technique allows the tracing of overspent funds. Thus, it would be beneficial to be able to accomplish revokable anonymity with traceability by tracing option (1) in a manner in which the computational cost of doing the trace is less than linear with respect to the number of issued signatures.

Another benefit of the prior art magic ink signatures technique compared to other schemes with revokable anonymity is that it allows the signer/bank to distinguish between valid signatures that were produced by the bank servers, and valid signatures that were produced by another party holding the signing keys. This is important if there is a suspicion that the signing keys of the banks have been corrupted by, for example, an attacker obtaining the Signer bank's secret key, enabling the attacker to create untraceable counterfeit E-Coin (called a "bank robbery attack" in the literature). While the magic ink signature technique can act as a definitive deterrent against attacks aiming to corrupt the bank keys, the very high cost of the filtering makes the method impractical unless it is certain that the signing keys have been corrupted, i.e., it is only practical to use the method for confirmation and/or correction of the problem after it occurs rather than for early detection of the problem.

SUMMARY OF THE INVENTION

The present invention is an improvement upon the magic ink signature scheme. According to the present invention, when a Receiver makes a request m to a Signer (e.g., a bank customer asks the bank to issue E-Coin), the Receiver includes a "hint generation value" $m_e$. The hint generation value $m_e$ is essentially an encrypted version of the request m. It is simultaneously decrypted and blinded by the Signer and is stored on the signing transcript as a hint value $m_h$.

When a merchant/Verifier transmits deposit signatures corresponding to spent E-Coin to be deposited, the transmitted deposit signature, which includes the encrypted request m (and which is, therefore, equivalent to the hint generation value $m_e$), is decrypted and blinded by the bank in the same manner as was the hint generation value $m_e$. Thus, the encrypted incoming deposit signature from the merchant/Verifier should include a value that matches the hint value stored on the signing transcript, confirming that the E-Coin is valid without revealing any identifying information about who spent the E-Coin, i.e., anonymity is preserved. If the incoming deposit signature does not contain a value that matches a hint value in the signing transcript, the bank immediately knows that counterfeit E-Coin is being circulated and can take the steps necessary to stop any further illicit transactions and attempt to identify the source of the corruption. Further, since the incoming encrypted deposit signature will contain a value that matches the hint value on the signing transcripts in the case of a valid transaction, tracing time (e.g., for tracing of overdrafts) is significantly reduced because the hint value will identify the location of the appropriate record in the transcript and thus an exhaustive, item-by-item search of the transcript is avoided.

DETAILED DESCRIPTION OF THE PREFERRED EMBODIMENT

Figure 1:
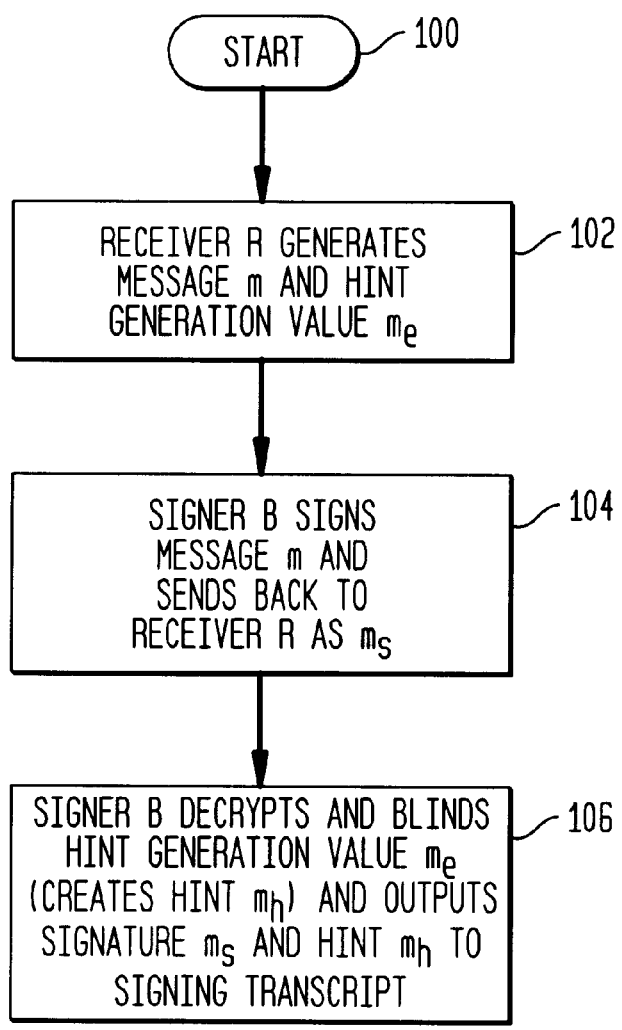
FIG. 1 is a flowchart of the hint generation process in accordance with the present invention.

FIG. 1 is a flowchart illustrating the basic steps involved in generating a hint value $m_h$ as defined above. Referring to FIG. 1, at step 102, a Receiver R generates a message m and sends it to a Signer bank B. The message m is a request asking the bank to issue E-cash to Receiver R, and the message m includes a signature which identifies Receiver R to the bank for verification.

To blind the message m, it is split into several portions with the portions being sent to different signing servers according to the "magic ink signatures" method described above so that no single signing server has the complete message m. However, at the same time the entire complete message m is also sent, in encrypted form (called hint generation value $m_e$ in encrypted form) from the Receiver to each signing server that comprises the Signer.

At step 104, the Signer B signs the message m, thereby "minting" the E-coin as requested, and sends this message m, now including Signer B's signature, back to Receiver R, as $m_s$. At the same time, in step 106, Signer B decrypts and blinds the hint generation value $m_e$ and stores it on a Signing Transcript with the signed message $m_s$ as hint value $m_h$.

According to the present invention, the hint generation values $m_e$ are voluntarily introduced by the Receiver during the initial signing session (the withdrawal). The hint values $m_h$ are used to efficiently trace from a signature to a signing session. Since the hint generation values $m_e$ are voluntarily submitted by the Receiver there are no controls on their correctness. However, a Receiver would have no reason to submit an incorrect hint generation value me, since no benefit will be gained by doing so and since, if necessary, the Signer bank can institute a penalty for submitting an incorrect hint generation value $m_e$. By submitting the hint generation value $m_e$, the computational cost for tracing is logarithmic (or less) rather than linear for tracing type (1) described above. If, however, an incorrect hint generation value $m_e$ is input, the system can fall-back to the linear-time tracing mechanism of the prior art magic ink solution.

Figure 2:
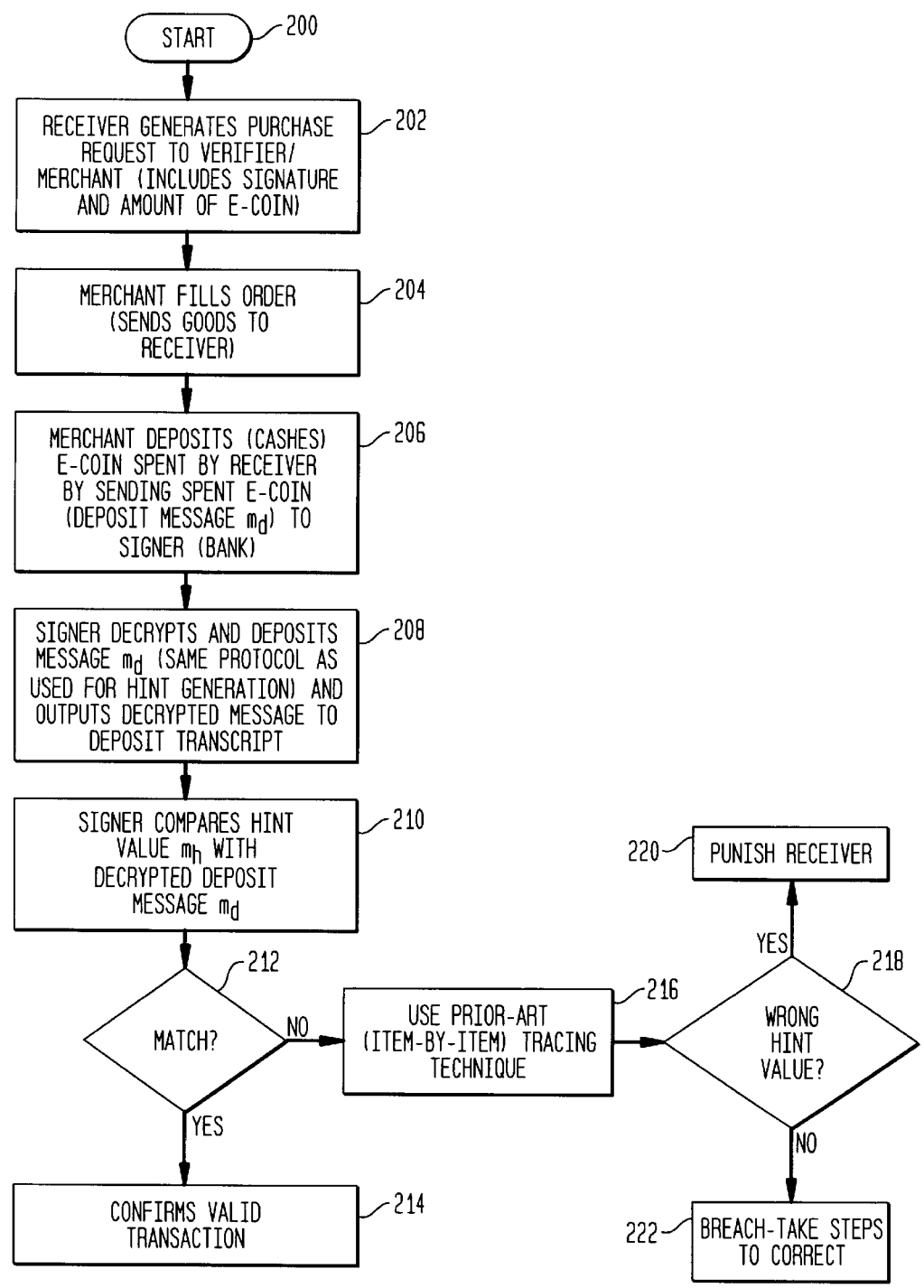
FIG. 2 is a flowchart of the operation of the present invention to monitor transactions.

FIG. 2 illustrates the operation of the present invention, using the hint values $m_h$ to monitor transactions. Referring to FIG. 2, at step 202 the Receiver, having possession of the E-Cash generated by the Signer in accordance with the steps of FIG. 1, generates a purchase request to a particular verifier/merchant by sending to the verifier/merchant electronically the signed message $m_s$ along with an authorization to allow the verifier/merchant to use a specific portion of the E-cash in exchange for a purchased item or service. At step 204, the verifier/merchant fills the order and, at step 206, the verifier/merchant deposits the spent E-coin by sending a deposit message $m_d$ to the bank identifying the amount and including the signature attached by the bank when the E-coin was issued.

At step 208, the Signer B decrypts and blinds the deposit message $m_d$ from the Verifier/merchant using the same protocol used to generate the hint value $m_h$ and outputs the decrypted message to a Deposit Transcript. At step 210, the Signer B compares the hint value $m_h$ stored on the Signing Transcript with the decrypted deposit messages $m_d$ on the Deposit Transcript. For each hint value $m_h$ on the signing transcript that has a match on the deposit transcript, this indicates that it was a valid transaction, and nothing more need be done (step 214).

However, if a situation arises in which there is no match between deposit message $m_d$ from a deposit transcript and a hint value $m_h$ on the signing transcript, at step 216 a tracing is conducted, using well-known prior art techniques, to track the unmatched signatures. If at block 218 it is determined that the reason for the lack of a match was the submission of a wrong hint generation value $m_e$, at step 220 the Receiver who submitted the wrong hint generation $m_e$ value is "punished" (i.e., if it was inadvertent, then the Receiver might be simply advised of the problem; if has happened repeatedly for a particular Receiver, some form of punishment may be imposed). If, at step 218, it is determined that the submitted hint generation value $m_e$ is not wrong, this is an indication of a breach in the system, and steps can be taken to stop any further damage and corrective measures can be instituted (step 222).

As noted above, in the preferred embodiment, the hint value $m_h$ comprises a decrypted and blinded version of the hint generation value $m_e$ that the Receiver A sends to from the Signer bank B. To assure that the hint value $m_h$ is not subject to attack, in the preferred embodiment it must not possible for an adversary corrupting less than a quorum of signer/tracer servers to compute the hint value $m_h$ corresponding to a signature (and vice versa), while a quorum of signer/tracers can efficiently compute the hint value $m_h$ given a signature. A public key is divided among a plurality of bank servers, and the bank servers issue a divided signature which is assembled on a public key. To speed up the process of tracing should the need arise, a list of signing sessions having indices sorted with respect to the hint values $m_h$ is stored; thus, the trace can be directed to a particular session identified by the hint value $m_h$.

In order to trace from a signature S to a particular signature session, a quorum of tracing servers compute the hint value $m_h$ from a given signature, and select the corresponding record from the index of the list of sessions. If no record is found, this means that either counterfeit E-Coin is being circulated or that the Receiver gave an incorrect hint generation value $m_e$ when the signing session occurred, and the process reverts to the linear search method described in used in the prior art magic ink signatures technique.

The traditional way to distributively compute and verify the correct form of any secret value (which would include the hint value $m_h$ of the present invention) involves sharing of the hint generation value $m_e$ submitted by the Receiver among all entities of the distribution. This is found, however, to drastically increase the costs incurred in proving the validity of a computation. Accordingly, according to the present invention, a computation is performed on an encrypted transcript. It is well known that it is generally difficult to perform computations on encrypted data. However, the type of computation (multiplication and exponentiation) needed to be performed for, the processing of the hint value $m_h$ can be done very efficiently on encrypted data. This method might therefore be of independent interest, and might be applied to similar situations in order to boost the efficiency of other multi-party computations.

The method of the present invention does not affect in any way the resulting signature. The signature obtained by the Receiver is still a standard DSS signature (on a message of a specific format). This facilitates immediate commercial use of the present invention with only a nominal increase in computational cost and data-storage requirements.

An example of a process for carrying out the above-described method of the present invention is as follows. In describing the preferred embodiment of the present invention, the following protocols are used.

Notation: Since different moduli are used at different times, $[op]_z$ is used to denote the operation op modulo z where this is not clear from the context.

ElGamal: ElGamal encryption is used. To encrypt a value m using the public key y, the person who performs the encryption picks a value $Y \in_u Z_q$ uniformly at random, and computes the pair $(a,b)=(my^v, g^v)$. Thus, (a,b) is the encryption of m. In order to decrypt this and obtain m, $m=a/b^x$ is calculated.

Mix-Networks: Consider an input list $(\alpha_1, \ldots, \alpha_n)$. A mix-network produces an output which is a random (and secret) permutation of $(f(\alpha_1), \ldots, f(\alpha_n))$, for a given function f. In the preferred embodiment of the present invention, a robust (i.e., such that it produces the correct output given an honest quorum of participants) a prior-art mix-network decryption scheme is used. Mix networks (described generally in "A Practical Mix" by M. Jakobsson, Advances in Cryptology-Proceedings of Eurocrypt '98, pp. 448–461) have been used generally in connection with decryption of electronic messages but have not been used in connection with the detection of electronic bank robberies.

The Digital Signature Standard (DSS): The underlying signature algorithm used in the preferred embodiment is the Digital Signature Standard (DSS).

Key Generation: A DSS key is composed of public information p, q, g, a public key y and a secret key x, where:

1. p is a prime number of length l where l is a multiple of 64 and $512 \leq l \leq 1024$.
2. q is a 160-bit prime divisor of p−1.
3. g is an element of order q in $Z_p^*$.
4. x is the secret key of the signer, a random number $1 \leq x \leq q$.
5. $y=[g^x]_p$ is the public verification key.

Signature Algorithm: Let $m \in Z_q$ be a hash of the message to be signed. The signer picks a random number k such that $1 \leq k < q$, calculates $k^{-1}$ mod q (without loss of generality) k and $k^{-1}$ values compared to DSA description are interchanged), and sets $$r=[[g^{k-1}]_p]_q$$
$$s=[k(m+xr)]_q$$

The pair (r,s) is a signature of m.

Verification Algorithm: A signature (r,s) of a message m can be publicly verified by checking that $r=[[g^{ms-1}y^{rs-1}]_p]_q$.

Let Q be a quorum of t servers in $S_1 \ldots S_2$, and assume that the message m to be signed (corresponding to the withdrawal) is of the form $m=h^M \mod p$ for a generator h. Commonly, this type of scheme is used to sign a public key, in which m is this public key, and M is its corresponding secret key. (For messages M that can be guessed with a non-negligible probability, an alternative form $m=^M h_2{}^R$ for a random R can be employed.).

First, the system must be initialized. The servers distributively generate a random secret value ("secret") x for signature generation, using a $(t_s,1n)$ secret sharing scheme, a random secret $x_t$ for tracing, using a $(t_{t1}n)$ secret sharing scheme, and a random secret $x_t$ for hint generation, using a $(t_{h1}n)$ secret sharing scheme. Each server Si publishes its shares of the public keys $y_i=[g^x{}_{i}]_p$, $y_{ti}=[g^x{}_{ti}]_p$, and $y_{hi}=[g^x{}_{hi}]_p$, from which $y=[g^x]_p$, $y_t=[g^x{}_t]_p$, and $y_h=[g^x{}_h]_p$ are interpolated in a known manner. Each server then proves knowledge of his secret shares $x_i$, $x_{ti}$ and $x_{hi}$ to the other servers; if a particular server fails, then it is replaced and the protocol restarts. Finally, the signing public key y is published.

Once the system has been initialized it is ready to conduct a signature session. To conduct a signature session, a session initialization is required. Before starting the signature generation protocol, the Receiver A has to send to the Signer B its identity ID and a proof of knowledge of the secret key corresponding to its identity ID. The distributed signers under the control of Signer B designate a session identification number, SessionID=ID||l, where l is a number making SessionID a unique string so that each trace gives a unique answer.

To generate the signature for this session, the distributed signers prepare a temporary key pair:

(a) The set of signers $S_i|i \in Q$ distributively generate a private session key $\bar{k} \in_u Z_q$.

(b) Signer $S_i$ has a share $\bar{k}_i$ and publishes $[g^{\bar{k}}{}_i]_p$ (a portion of the public session key).

(c) The signers compute $\bar{r}=[g^{\bar{k}}-1]_p$, using known methods for computing reciprocals.

(d) $\bar{r}$ is sent to the Receiver R.

2. The Receiver R wants a signature on the message $m=[h^M]_p$.

(a) Receiver R generates two blinding factors, $\alpha, \beta \in_u Z^q$.

(b) Receiver R computes blinded versions of m and $\bar{r}$: $\mu=[m\alpha]_q$, $r=[[\bar{r}^\beta]_p]_q$ and $\rho=[r\alpha]_q$.

(c) Using a $(t_s,n)$ secret sharing, Receiver R computes $(\mu_1 \ldots \mu_n)$ of $\mu$, with public information $(g''_1 \ldots g''_n)$ and a $(t_s,n)$ secret sharing $(\rho_1 \ldots \rho_n)$ of $\rho$, with public information $(y_t^{\rho 1} \ldots y_t^{\rho n})$.

(d) Receiver R computes an ElGamal encryption of m with respect to the public hint key $y_h$: $(a,b)=(mg^\gamma, y_h^\gamma)$, where $\gamma \in Z_q$.

(e) Receiver R sends $(\mu_i, \rho_i, a, b)$ to signature generating server $S_i$.

3. The tracing values and the signature are generated.

(a) The distributed signers interpolate the tag, tag=$([g'']_q, [y_t^\rho]_q)$.

(b) After having verified the correctness of the computation of (a,b) (using a robust protocol such as that described below), the distributed signers robustly calculate the hint value hint=$a^{x_h}/b$, using the method described below. If R did not cheat, the hint value equals $M^{x_h}$.

(c) The hint value is stored in a record along with tag, SessionID and ID.

(d) The set of signers $S_i|i \in Q$ distributively generate the DSS signature on the message $\mu$, using the (shared) public session key $\rho$; $\sigma$ is calculated as follows: $S_i$ generates $\sigma_i=[\bar{k}(\mu+x_i\rho_i)]_q$. Then, $\sigma=[\bar{k}(\mu+x\sigma)]_q$ is interpolated from the $\sigma_i$'s using a known method for multiplication of secrets, for example, the method described in R. Gennaro, S. Jarecki, H. Krawczyk, and T. Rabin, "Robust Threshold DSS Signatures," Advances in Cryptology-Proceedings of Eurocypt '96, pg. 354–371.

(e) The servers send $\sigma$ (a blinded version of the signature Receiver R needs) to R.

4. The signature Receiver R unblinds the signature: $s=[\sigma\alpha^{-1}\beta^{-1}]_q$. The triple (m,r,s) is a valid DSS signature on m.

The hint value is calculated as follows. For the purpose of this explanation, let $x_h$ be a private key distributively held by the tracing servers, and let $y_h=[g^{x_h}]_p$ be the corresponding public key. First, the Receiver R calculates an ElGamal encryption of m, by choosing a $\gamma \in_u Z_q$ and calculates $(a,b)=(mg^\gamma, y_h^\gamma)=h^M g^\gamma, y_h^\gamma)$. This pair is sent to the distributed servers.

Next, the servers distributively compute $hint_i=a^{x_{hi}}/b$. Then, in order to prove that every server has performed the correct exponentiation (so that tracing will be possible) the servers run a known protocol for proving valid exponentiation, for example, of the type described in D. Chaum and H. VanAntwerpen, "Undeniable Signatures," Advances in Cryptology-Proceedings of Crypto '89, pp. 212–216. This protocol is a proof that $\log_a(hint_i b)=\log_g(y_{hi})$ for a given quadruple $(a,g,(hint_i b), y_{hi})$. Finally, the servers compute hint as the Lagrange-weighted product of the shares $hint_i$ of the servers in the quorum (this value equals $[m^{x_h}]_p$ if R did not cheat).

Attacks are possible if it is possible for an attacker to insert previously seen encryptions (e.g., on a withdrawal request), or functions of them, and observe what hint is produced. In other words, the attacker could use the hint-generation protocol as an oracle to compute the hint of a known signature and then generate illicit signatures with the correct hint value. For example, assume an attacker could take a value m' of a known signature, encrypt the known signature (claiming to withdraw new E-Coin) and send $(a,b)=(m'g\gamma, y_h^\gamma)$ to the distributed signers. Then one "dishonest" signer (a signer under the control of the attacker) would watch to see what value hint=$m'^{x h}$ is produced: this would efficiently trace the value m' because everyone, including the dishonest participants, get to know the corresponding record of the signature. Therefore, to avoid this scenario, in the preferred embodiment the Receiver must prove that it knows the format of the portion of the encryption that will be raised to the $x_h$ power.

This problem is resolved according to the present invention by requiring that the solution for the encryption satisfy plaintext awareness, a concept that is described, for example, in Bellare, Desai, Pointcheval and Rogaway, "Relations Among Notices of Security for Public-Key Encryption Schemes," Advances in Cryptology-Proceeding of Crypto '98, pp. 26–45. This requirement guarantees that the Receiver knows the plaintext, preventing this type of attack. Note, though that this must be done without revealing any transcript-specific information.

This requirement is accomplished by proving knowledge that $(a,b)=h^m g^\gamma, y_h^\gamma)$, without leaking any information about the message $m=h^M$. It is only the value a in the signature generation protocol that is important; if b is not of the right form, this only identifies a wrong hint-value which, although an inconvenience to the bank, does not constitute a security breach.

The above proof can be established as follows:

1. Each signer $S_i$, $i \in Q$ (which in this case corresponds to a participating signing server acting as a verifier) selects a value $\epsilon_i \epsilon_u Z_q$. $S_i$ publishes $(\hat{h}_i, \hat{g}_i) = ([h^{\epsilon_i}]_p, [g^{\epsilon_i}]_p$. The pair $(\hat{h}, \hat{g}) = ([\Pi_{i \in Q} \hat{h}_i]_p, [\Pi_{i \in Q} \hat{g}_i]_p$ is sent to the signature Receiver R.

2. The prover (in this case, the signature Receiver R) computes $\hat{a} = \hat{h}^M \hat{g}^\gamma]_p$, where M is the pre-image of m and $\gamma$ is the blinding exponent chosen for the ElGamal encryption. The prover sends a commitment com($\hat{a}$) to the verifiers.

3. Each verifier $S_i$ publishes its value $\epsilon_i$ and $\epsilon = [\Sigma_{i \in Q} \epsilon_i]_q$ is sent to the prover.

4. The prover verifies that $(\hat{h}, \hat{g}) = ([h^\epsilon]_p, [g^\epsilon]_p$ and halts if this is not satisfied (failure to satisfy the equation is an indication that a "cheat" has occurred. Otherwise, the prover decommits to his commitment of a to the verifiers.

5. Each verifier checks that $\hat{a} = [a^\epsilon]_p$, and "accepts" if this equation is true.

Tracing techniques (2) and (3) described above are performed in the same manner as they are performed in the prior art and are, therefore, not discussed herein. Regarding tracing technique (1), for tracing from a known signed message to a particular signing session, the trace is performed as follows. As mentioned above, there is a secret key x for signing, a secret key $x_t$ for tracing, and a secret key $x_h$ for generating a hint. Furthermore, there is a tag=$([g^{ht}]_q, [y_t^p]_q)$ for tracing purposes.

Given a description (m,r,s), the tracing servers compute a value $trace_c = [m^x{}_h]_p$ to match with stored hints. Then the tracing servers compare traces with the stored hints. If traces equals a hint for a particular record, then the signed message is deemed to correspond to the signing session of that record. If there is no hint value which equals traces, then the tracing servers have to calculate $(trace_a, trace_b) = ([tag_a{}^{rm-1}]_p, tag_b)$ for each potential withdrawal session. Using a known protocol for verification of undeniable signatures (e.g., as described in the previously mentioned Chaum and VanAntwerpen article), the tracing servers verify whether $\log_g h = \log_{trace_a} trace_b$, which holds if the signature corresponds to the tag.

As noted above, in addition to economizing the tracing techniques available, the present invention also comprises a method to detect that the secret signing key has been compromised. According to the preferred embodiment, the distributed signers periodically blind all hints for signing sessions, and, using a mix-network, blind portions of the recently "deposited" signatures (signatures from the spent E-Coin transcripts), and then verify that each blinded deposited signature corresponds to a blinded signature on the blinded session transcript. If there is any blinded deposited signature that has no match, then this signature is unblinded and traced. If, during tracing, a matching signature on the signing session transcript is not found, this is an indication that the signing key has been compromised and the servers output a "signing key compromised" message to trigger the taking of security measures. If, after unblinding, there is a signature transcript found to match the signature on the spending transcript, this indicates that the signature simply had an incorrect hint value submitted with it, in which case appropriate action is taken to punish the Receiver/withdrawer.

A protocol for accomplishing illicit signature detection is as follows:

1. A list of hints $(hint_1, \ldots, hint_K)$, which have been generated during signature generation protocols is input to a mix server. A blinding exponent $\zeta$ is distributively chosen so that $\zeta = \Pi_{i \in Q} \zeta_i$ where $\zeta_i$ is the share of blinding elements $\zeta$ held by server $S_i$. The distributed servers robustly compute $(hint^\zeta{}_1, \ldots hint^\zeta{}_K)$ in accordance with well-known procedures.

2. (a) The distributed servers have a list $(m_1, \ldots, m_K$ corresponding to the messages of all of the recently deposited signatures (i.e., a spent coin transcript identifying those signatures deposited since the last run of the detection protocol).

(b) The distributed servers robustly blind this list with the same blinding exponent $\zeta$ as used for the hint list and get $(m^\zeta{}_1, \ldots, m^\zeta{}_k)$.

(c) The mix servers perform a mix-decryption on the blinded list, resulting in a permutation of the list $hint_1, \ldots, hint_k$, where $hint_1 = m_i^\zeta)^x{}_h$.

3. All entries from the blinded spent coin list that exist as entries in the blinded hint list are removed. Each remaining item hint, is unblinded by computing $m_i = hint_1^{1/(\zeta \times h)}$. Each corresponding signature is traced using the previously described tracing methods (1), (2), and/or (3). If the trace is successful, the receiver of the signature is punished for having given the incorrect hint value; if there is an unsuccessful trace, then the servers output "signing key corrupted" message which alerts the bank to take immediate action to prevent further counterfeiting.

While there has been described herein the principles of the invention, it is to be understood by those skilled in the art that this description is made only by way of example and not as a limitation to the scope of the invention. For example, although the present invention is described in the preferred embodiment as being applicable in an electronic commerce application, it finds application in any situation in which there is a need to have anonymous digital signatures which are revocable. Accordingly, it is intended by the appended claims, to cover all modifications of the invention which fall within the true spirit and scope of the invention.

We claim:

1. A method of conducting electronic commerce between a signer, a receiver, and a verifier, utilizing E-coin having a digital signature which can be verified as being valid without compromising the anonymity of the digital signature, comprising the steps of:

generating E-Coin comprising a digital signature S and a message m;

generating a hint value $m_h$ by said signer based on said message m;

storing said hint value $m_h$; and confirming said that said E-Coin is valid using said hint value $m_h$.

2. A method as set forth in claim 1, wherein said step of generating a hint value $m_h$ comprises the step of decrypting and blinding said message m.

3. A method as set forth in claim 2 wherein said verifier makes a deposit of E-coin by sending a deposited E-coin value $m_d$ to said signer, and wherein said confirming step comprises the steps of:

decrypting deposited E-coin to create a decrypted version of message $m_d$ associated with said deposited E-coin; and comparing said deposited E-coin value $m_d$ with said hint value $m_h$.

4. A method as set forth in claim 3 wherein said E-coin generating step is performed by said signer.

5. A method as set forth claim 4, wherein said receiver transmits said E-coin to said verifier, and wherein said verifier deposits said E-coin by transmitting said E-coin received from said receiver to said signer, and said signer performs said confirming step on the deposited E-coin received from said verifier.

6. A method as set forth in claim 3 wherein said signer stores a transcript of all hint values $m_h$ that it generates, and where said signer outputs an indication of a valid transaction if said message $m_d$ matches any hint value $m_h$ stored on said transcript.

7. A method as set forth in claim 3 wherein said signer stores a transcript of all hint values $m_h$ that it generates, and wherein said signer:

outputs an indication of an invalid transaction if said message $m_d$ does not match any hint value $m_h$ stored on said transcript; and initiates a tracing procedure to determine the source of the invalid transaction.

8. A method for verifying the validity of a digital signature S without compromising its anonymity in a system having a signer, a receiver, and a verifier, comprising the steps of:

generating a hint generation value $m_e$;

receiving a hint value $m_h$ generated by said signer based on said hint generation value $m_e$;

storing said hint value $m_h$; and confirming said that said digital signature S is a valid digital signature using said hint value $m_h$.

9. A method as set forth in claim 8, wherein said step of generating a hint value $m_h$ comprises the step of decrypting and blinding said hint generation value $m_e$.

10. A method as set forth in claim 9, wherein said confirming step comprises the steps of:

decrypting and blinding the digital signature S to create an encrypted digital signature $S_H$; and comparing said encrypted digital signature $S_H$ with said hint value $m_h$.

11. A method for verifying the validity of a digital signature S without compromising its anonymity in a system having a signer a receiver, and a verifier, comprising the steps of:

receiving a hint generation value $m_e$;

generating a hint value $m_h$ by said signer based on said hint generation value $m_e$;

storing said hint value $m_h$; and confirming said that said digital signature S is a valid digital signature using said hint value $m_h$.

12. A method as set forth in claim 11, wherein said step of generating a hint value $m_h$ comprises the step of decrypting and blinding said hint generation value $m_e$.

13. A method as set forth in claim 12, wherein said confirming step comprises the steps of:

decrypting and blinding the digital signature S to create an encrypted digital signature $S_H$; and comparing said encrypted digital signature $S_H$ with said hint value $m_h$.

* * * * *